(12) United States Patent
Dittrich et al.

(10) Patent No.: US 6,648,406 B2
(45) Date of Patent: Nov. 18, 2003

(54) MECHANISM FOR A WIND DEFLECTOR OF AN OPENABLE MOTOR VEHICLE ROOF

(75) Inventors: Wolfgang Dittrich, Gilching (DE); Erwin Kohout, Munich (DE); Stjepan Radmanic, Mammendorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/963,662

(22) Filed: Sep. 27, 2001

(65) Prior Publication Data

US 2002/0084677 A1 Jul. 4, 2002

(30) Foreign Application Priority Data

Sep. 27, 2000 (DE) .......................... 100 48 983

(51) Int. Cl.$^7$ .................................................. B60J 7/22
(52) U.S. Cl. ........................................................ 296/217
(58) Field of Search .......................................... 296/217

(56) References Cited

U.S. PATENT DOCUMENTS

| | | | | |
|---|---|---|---|---|
| 3,711,150 A | * | 1/1973 | Perks | 296/217 |
| 4,268,085 A | * | 5/1981 | Sakai et al. | 296/217 |
| 4,684,168 A | * | 8/1987 | Lupo | 296/217 |
| 4,738,483 A | | 4/1988 | Boots | 296/217 |

FOREIGN PATENT DOCUMENTS

| | | | |
|---|---|---|---|
| DE | 1 149 627 | 5/1963 | |
| DE | 11 49 627 B | 5/1963 | |
| DE | 24 16 173 A | 10/1975 | |
| DE | 25 33 516 | 6/1976 | |
| DE | 30 39 769 | 11/1982 | |
| DE | 3425271 A1 | 12/1986 | |
| DE | 3823316 A1 | 1/1990 | |
| DE | 3922874 * | 1/1991 | 296/217 |
| DE | 41 15 627 | 7/1992 | |
| DE | 19713360 C1 | 4/1998 | |
| EP | 0734894 A2 | 10/1996 | |
| EP | 0 955 194 A1 | 11/1999 | |
| GB | 980012 * | 1/1965 | 296/217 |
| GB | 2216074 * | 10/1989 | 296/217 |

* cited by examiner

Primary Examiner—Dennis H. Pedder
(74) Attorney, Agent, or Firm—Nixon Peabody LLP; David S. Safran

(57) ABSTRACT

A mechanism for a wind deflector of a motor vehicle roof is provided which includes a raising lever which is moved in a raising direction by means of a spring. A displacement of a back edge of the wind deflector in a lengthwise direction is balanced during the swiveling motion by means of a compensation device. A spring is used directly as the compensation device.

9 Claims, 1 Drawing Sheet

MECHANISM FOR A WIND DEFLECTOR OF AN OPENABLE MOTOR VEHICLE ROOF

BACKGROUND OF THE INVENTION

1. Technical Field

The invention relates to a mechanism for the wind deflector of an openable motor vehicle roof which includes a raising lever which is moved in a raising direction by means of a spring, wherein the displacement of a back edge of the wind deflector in a lengthwise direction is balanced during a swiveling motion by means of a compensation device.

2. Description of Related Art

European Patent Application 0 955 194 A1 discloses one such mechanism in which a raising lever is raised by a spring element which is located essentially horizontally in the closed position of the wind deflector by means of a carriage/crank arrangement which can be moved by the spring element. Since, in this known arrangement, in addition to the carriage arrangement, a guide for the carriage and a stationary carriage arrangement are also necessary, it is relatively complex in structure. Also, due to the plurality of components, it requires increased installation space.

SUMMARY OF THE INVENTION

One object of the present invention is to overcome the disadvantages and shortcomings of the prior art.

Another object of the invention is to provide a mechanism for a wind deflector which has a simple structure and reduces the installation space requirement.

The above objects along with other objects are achieved by providing a wind deflector including a compensation device, which is provided between the wind deflector and the raising lever for compensating for the motion of the rear edge of the wind deflector in the lengthwise direction during swiveling motion wherein the compensation device is formed directly by a spring. This obviates the necessity of additional guides, for example in the form of elongated holes.

One preferred embodiment of the invention calls for the spring acting preferably via a connecting rod on the back end of the raising lever. Since the installation space in an openable motor vehicle roof is most severely limited forward for a motor vehicle roof contour (which generally rises slightly to the rear with respect to installation height), this arrangement, in which the spring is located farther to the rear, is especially advantageous.

It is preferable that the raising lever, for swiveling the wind deflector back into the closed position, is pressed down by the horizontally movable cover. Since the raising lever in the closed position preferably assumes a horizontal, position, in another embodiment of the invention, at the start of the raising motion, a second spring acts as a kick spring from underneath on the raising lever in order to move it up and out of the horizontal position.

One advantageous use of the present invention is to act on a wind deflector louver which, in a closed position, is located flush with the cover located behind the wind deflector louver.

DESCRIPTION OF THE INVENTION

Figure 1:
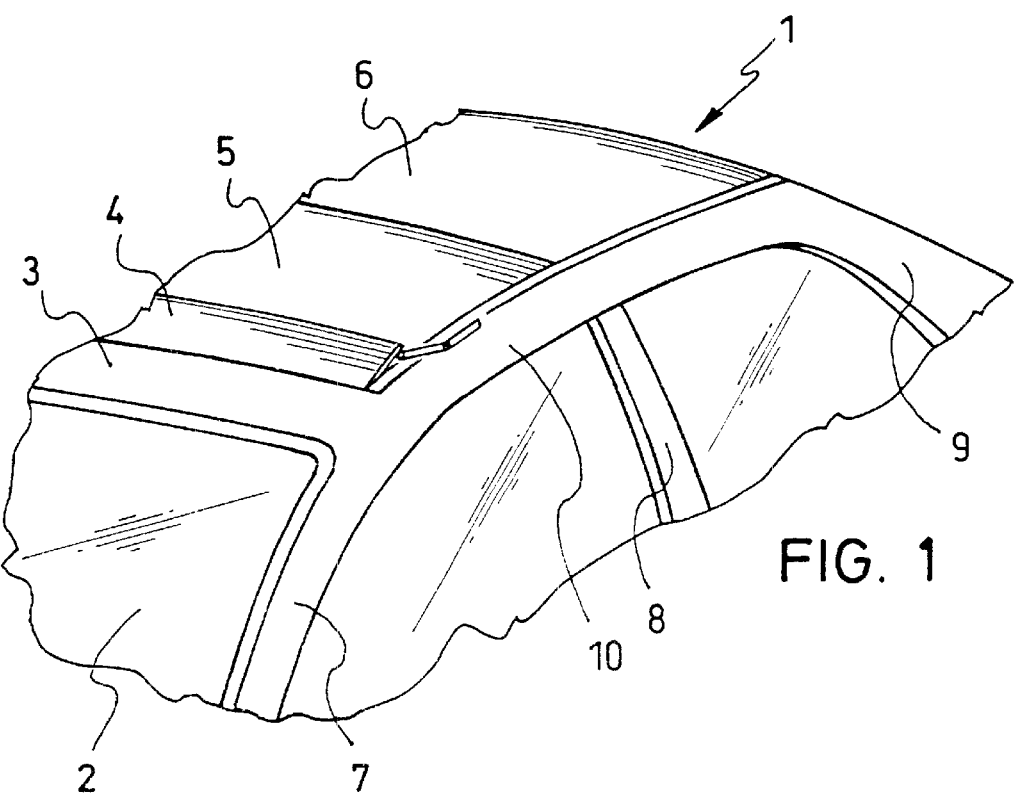
FIG. 1 shows a schematic perspective partial view of a motor vehicle roof incorporating the mechanism of the present invention.

FIG. 1 illustrates a solid motor vehicle roof 1 in which a front window 2 is adjoined by an apron 3, a wind deflector 4 made as a wind deflector louver, a movable cover 5 which is located behind the deflector, and a fixed roof pane 6 which lies behind the cover 5.

The motor vehicle roof 1 is bounded laterally by side members 10 which are connected to "A" columns 7, "B" columns 8 and "C" columns 9. The cover 5 can be raised with its rear edge and can be moved to the back over the fixed roof pane 6 along side guides (not shown).

Figure 2:
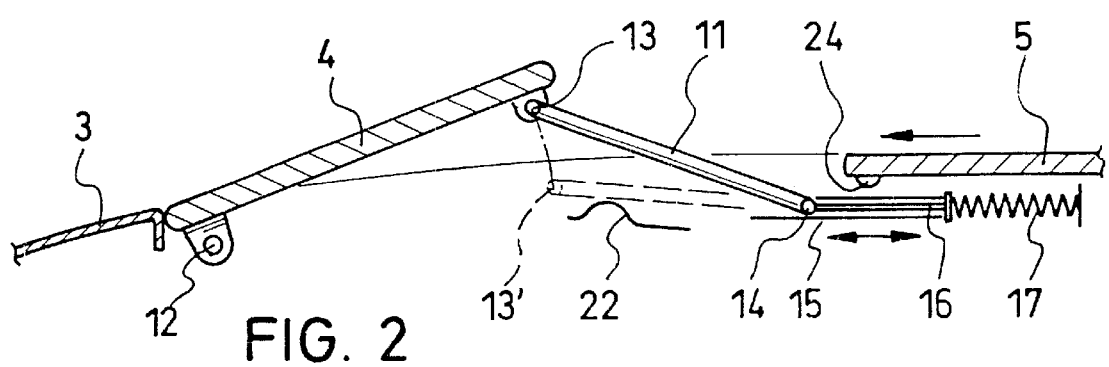
FIG. 2 shows the wind deflector mechanism of the present invention in a schematic side view.

Referring to FIGS. 1 and 2, the wind deflector 4 is supported near its front edge by means of a swivel support 12 to be able to swivel on the fixed motor vehicle roof 1 or on the apron 3. Near the rear edge of the wind deflector 4, in the embodiment shown in FIG. 2, a raising lever 11 is supported by means of a coupling 13. The back end of the raising lever 11 is connected by means of a lower coupling 14 to a connecting rod 16 with a back end attached to a spring 17 which is supported essentially horizontally on the fixed motor vehicle roof 1 or on a roof frame which is not shown and which is located at the side of the cover 5.

When the wind deflector 4 is located in its closed position, its back end adjoins flush with the front edge of the closed cover 5. In this closed position, the raising lever 11 assumes roughly a horizontal position. The connecting rod 16, which is guided in a roof-mounted guide 15, compresses the spring 17 with its back end. Since the force of the spring 17 in the horizontal position of the raising lever 11 cannot raise the raising lever 11, a kick spring 22 is provided to act on the bottom of the raising lever 11 and moves it into a position which is slightly bent toward the top at the start of raising motion, as is shown by the broken line in FIG. 2. The kick spring 22 can be omitted when the raising lever 11 in the closed position does not assume a horizontal position, but a position which is slightly bent toward the top. It should be noted that another set of components, i.e., springs 17, 22 etc., are preferably provided on the opposite side of the motor vehicle roof 1.

Although the springs 17 in the schematics are shown as helical compression springs, it should be understood that the springs 17 can also be built differently. For example, springs 17 may be gas pressure springs. In addition to the schematic embodiment showing kick springs 22 as bent leaf springs, any other form of springs which exert pressure on the raising lever 11 and imposes a small upward movement on the raising lever may be used as the kick springs 22. For example, a rubber spring is suitable for this purpose.

We claim:

1. A mechanism for a wind deflector of a motor vehicle roof, wherein the wind deflector is capable of a pivoting motion and includes a back edge, comprising:

a raising lever;

a first spring for swinging the raising lever in a raising direction after an initial swinging in the raising direction;

a compensation device for balancing the displacement of the back edge of the wind deflector in a lengthwise direction during the pivoting motion of the wind deflector, the compensation device including the first spring acting on a back end of the raising lever, said first spring becoming active for swinging the raisin lever in a raisin direction only after the initial swinging of the raising lever at the start of a raising motion; and a second spring acting on said raising lever for initially swinging the raising lever upwardly at the start of a raising motion.

2. The mechanism of claim 1, further including a connecting rod positioned to operatively connect the first spring to the back end of the raising lever, and a guide for guiding the connecting rod.

3. The mechanism of claim 1, further including a horizontally movable cover for pressing down the raising lever.

4. The mechanism of claim 2, further including a horizontally movable cover for pressing down the raising lever.

5. The mechanism of claim 1, wherein the raising lever assumes a substantially horizontal position when the wind deflector is in a closed position.

6. The mechanism of claim 1, further including a cover located behind the wind deflector, wherein the wind deflector is a wind deflector louver located flush with the cover when the wind deflector louver is in a closed position.

7. The mechanism of claim 2, further including a cover located behind the wind deflector, wherein the wind deflector is a wind deflector louver located flush with the cover when the wind deflector louver is in a closed position.

8. A mechanism for a wind deflector of a motor vehicle roof, wherein the wind deflector is capable of a pivoting motion and includes a back edge, comprising:

a raising lever;

a spring for moving the raising lever in a raising direction;

a compensation device for balancing the displacement of the back edge of the wind deflector in a lengthwise direction during the swiveling motion of the wind deflector, the compensation device including said spring acting on a back end of the raising lever; and a horizontally movable cover for pressing down the raising lever;

wherein the wind deflector is a wind deflector louver which, in a closed position, is located flush with the cover, and the cover is located behind the wind deflector louver.

9. The mechanism of claim 5, further including a cover located behind the wind deflector, wherein the wind deflector is a wind deflector louver located flush with the cover when the wind deflector louver is in the closed position.

* * * * *